United States Patent
Yamane et al.

(10) Patent No.: US 9,850,399 B2
(45) Date of Patent: Dec. 26, 2017

(54) WATER/OIL-REPELLENT TREATMENT AGENT HAVING HEAT RESISTANCE, METHOD OF PREPARATION, AND TREATED ARTICLE

(71) Applicant: Shin-Etsu Chemical Co., Ltd., Tokyo (JP)

(72) Inventors: Yuji Yamane, Annaka (JP); Ryusuke Sakoh, Annaka (JP); Takashi Matsuda, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/920,082

(22) Filed: Oct. 22, 2015

(65) Prior Publication Data
US 2016/0137878 A1    May 19, 2016

(30) Foreign Application Priority Data
Nov. 17, 2014 (JP) ................. 2014-232583

(51) Int. Cl.
| | | |
|---|---|---|
| C09D 171/00 | (2006.01) | |
| C08G 65/336 | (2006.01) | |
| C09D 183/00 | (2006.01) | |
| C08J 11/04 | (2006.01) | |
| C09D 183/12 | (2006.01) | |
| C08G 77/46 | (2006.01) | |
| C08G 65/00 | (2006.01) | |
| B32B 17/10 | (2006.01) | |

(52) U.S. Cl.
CPC ......... *C09D 171/00* (2013.01); *C08G 65/007* (2013.01); *C08G 65/336* (2013.01); *C08G 77/46* (2013.01); *C08J 11/04* (2013.01); *C09D 183/00* (2013.01); *C09D 183/12* (2013.01); *B32B 17/10* (2013.01)

(58) Field of Classification Search
CPC .................... C08G 65/226; C08G 65/336
See application file for complete search history.

(56) References Cited

U.S. PATENT DOCUMENTS

| | | | | |
|---|---|---|---|---|
| 2012/0270057 A1* | 10/2012 | Yamane | .................. | C03C 17/30 428/429 |
| 2014/0234543 A1* | 8/2014 | Ito | .......................... | B05D 3/107 427/341 |
| 2014/0363682 A1* | 12/2014 | Matsuda | ............... | C07F 7/1836 428/429 |
| 2015/0004419 A1* | 1/2015 | Yamane | .................. | C08G 77/24 428/429 |
| 2015/0274889 A1* | 10/2015 | Sakoh | .................. | C08G 65/336 428/410 |
| 2015/0275035 A1* | 10/2015 | Yamane | ............... | C08G 65/336 428/429 |
| 2016/0040039 A1* | 2/2016 | Yamane | .................... | C07F 7/00 428/429 |

FOREIGN PATENT DOCUMENTS

| | | |
|---|---|---|
| CN | 104119524 A | 10/2014 |
| JP | 2000-345046 A | 12/2000 |
| JP | 2003-64345 A | 3/2003 |
| JP | 2012-72272 | 4/2012 |
| JP | 2013-136833 A | 7/2013 |
| JP | 2013-221135 A | 10/2013 |

OTHER PUBLICATIONS

Online boiling point calculator with inputs (no date).*
Office Action dated Sep. 26, 2017 issued in corresponding Japanese patent application.

* cited by examiner

*Primary Examiner* — Marc Zimmer
(74) *Attorney, Agent, or Firm* — Oblon, McClelland, Maier & Neustadt, L.L.P.

(57) ABSTRACT

A water/oil repellent treatment agent which includes a specific polymer-modified silane having a fluorooxyalkylene structure on the main chain and a hydrolyzable group at the end of the molecular chain, and/or a partial (co)hydrolyzate/condensate thereof, has a percent weight loss following one hour of exposure at 250° C. of 10% or less. The treatment forms a layer having excellent water and oil repellency, scuff resistance and mold release properties even when heated to 250° C. or more.

14 Claims, No Drawings

WATER/OIL-REPELLENT TREATMENT AGENT HAVING HEAT RESISTANCE, METHOD OF PREPARATION, AND TREATED ARTICLE

CROSS-REFERENCE TO RELATED APPLICATION

This non-provisional application claims priority under 35 U.S.C. §119(a) on Patent Application No. 2014-232583 filed in Japan on Nov. 17, 2014, the entire contents of which are hereby incorporated by reference.

TECHNICAL FIELD

The present invention relates to a water/oil repellent treatment agent which includes a fluorooxyalkylene group-containing polymer-modified silane and/or a partial (co) hydrolyzate/condensate thereof. The invention relates in particular to a water/oil repellent treatment agent which has excellent water and oil repellency, abrasion resistance and mold release properties, and which, in particular, retains excellent surface properties even when exposed to elevated temperatures of 250° C. or more, to a method of preparing the water/oil repellent treatment agent, and to articles treated therewith.

BACKGROUND ART

In recent years, to improve the appearance and visibility of optical articles, there has been a growing demand for a way to minimize smudging on the surface of such articles and a way to facilitate the removal of smudges. Because touch panel displays in particular are easily contaminated on the surface by skin oils, a water/oil repelling layer is generally provided thereon. The practice to date has been to use a protective glass or protective film to protect glass equipped with a touch sensor or film equipped with a touch sensor, and to provide a water/oil repelling layer on the surface of the protective glass or film. Recently, members having a water/oil-repelling function on the front side and a touch sensor function on the back side have been developed. Such members are obtained by mounting touch sensors on the back side of toughened glass, then water/oil-repellency treating the front side. However, for reasons having to do with production efficiency, there is a desire to first subject one side to water/oil-repelling treatment, and subsequently mount the touch sensors. A problem with this approach is that the water/oil-repellent layer has a poor heat resistance and is unable to withstand the high-temperature process of mounting the touch sensors.

From the standpoint of scuff and scratch resistance and fingerprint wipeability, preferred use is made of fluorooxy-alkylene group-containing polymer-modified silanes as the water/oil-repellent layer on the surface of touch panel displays. A cover glass or cover film is generally provided on the surface of a touch panel display, although cover glasses or films integral to touch sensors have recently been developed. Their production appears to involve two types of processes: methods in which the touch sensor is mounted on a substrate, following which the substrate is water/oil-repellency treated on the back side, and methods in which a touch sensor is mounted on the back side of a substrate that has already been water/oil-repellency treated. In the latter case, the water/oil-repellent layer must be able to withstand the heating step during mounting of the touch sensor.

Also, when a water/oil-repellent layer is provided as a mold release layer for thermal imprinting, it is essential that it withstand the heating temperature during processing. In cases where fluorooxyalkylene group-containing surface treatments have been used as a mold release layer in applications such as thermal imprinting, although such treatments have excellent mold release properties, owing to their poor heat resistance, they have been unable to withstand high-temperature processes.

Fluorooxyalkylene group-containing compounds have a very low surface free energy, and so generally possess such attributes as water and oil repellency, chemical resistance, lubricity, mold release properties and anti-smudging properties. These qualities are widely used industrially in, for example, water/oil-repellent stain-proofing agents for paper and textiles, lubricants for magnetic recording media, oil-proofing agents for precision machinery, mold release agents, cosmetics, and protective films. At the same time, these qualities also manifest as non-tackiness and non-adherence to other substrates. Thus, even when such a compound can be coated onto a substrate surface, having the coat adhere to the substrate has been difficult.

Of related interest here are silane coupling agents, which are familiar as materials that bond together substrate surfaces such as glass or fabric with organic compounds, and are widely used as coating agents for various types of substrate surfaces. Silane coupling agents have an organic functional group and a reactive silyl group (particularly a hydrolyzable silyl group) on a single molecule. The hydrolyzable group gives rise to a self-condensing reaction due in part to moisture in the air, forming a coat. In this coat, the hydrolyzable silyl groups bond chemically and physically with the surface of the glass, fabric or the like, resulting in a strong and durable coat.

Articles that have been surface-treated in the above manner are rarely used at elevated temperatures of 250° C. and up, and so heat resistance to 250° C. or more has not often been called for in water/oil-repellent layers. However, when touch sensors are to be mounted on the back side of water/oil-repellency treated substrates, and when water/oil repellent treatment agents are used as mold release agents in thermal imprinting, exposure to elevated temperatures sometimes occurs. In such cases, there is a need for the water and oil repellency, wear resistance and mold release properties to be retained even after the treated substrate has passed through a heating step.

The inventors earlier proposed, in JP-A 2012-072272, a fluorooxyalkylene group-containing silane of the formula shown below. Glass treated with this fluorooxyalkylene group-containing silane has, in particular, outstanding slip properties and excellent abrasion resistance. However, when this treated glass is exposed for one hour at a temperature of 250° C. or more, a satisfactory performance cannot always be obtained.

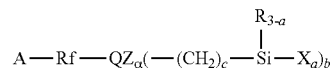

In the formula, Rf is $-(CF_2)_d-(OC_2F_4)_e(OCF_2)_f-O(CF_2)_d-$, A is a monovalent fluorine-containing group with a $-CF_3$ group at the end, Q is a divalent organic group, Z is an organopolysiloxane residue with a valence of 2 to 8 and having siloxane bonds, R is an alkyl group of 1 to 4 carbon atoms or a phenyl group, X is a hydrolyzable group, a is 2 or 3, b is an integer from 1 to 6, c is an integer from 1 to 5, α is 0 or 1, each d is independently 0 or an integer from 1 to 5, e is an integer from 0 to 80 and f is an integer from 0 to 80, with the proviso that the sum e+f is an integer from 5 to 100, and the repeating units may be randomly bonded.

It is therefore an object of this invention to provide a water/oil repellent treatment agent that is able to form a water/oil-repellent layer which, even after being heated at an elevated temperature of 250° C. or more, retains excellent water/oil repellency, abrasion resistance and mold release properties. Further objects of the invention are to provide a method for preparing the water/oil repellent treatment agent, and to provide an article treated therewith.

CITATION LIST

Patent Document 1: JP-A 2012-072272

DISCLOSURE OF THE INVENTION

The inventors have found that, in a water/oil repellent treatment agent which includes a specific amount of a specific polymer-modified silane having a fluorooxyalkylene structure on the main chain and containing a hydrolyzable group at the end of the molecular chain, and/or a partial (co)hydrolyzate/condensate thereof, and which imparts excellent water/oil repellency, abrasion resistance and mold release properties, by reducing the amount of low-molecular-weight components that evaporate on heating, a water/oil-repellent layer can be formed which retains excellent water/oil repellency, abrasion resistance and mold release properties even after being heated at elevated temperatures of 250° C. or more.

Accordingly, in one aspect, the invention provides a water/oil repellent treatment agent which includes at least one compound selected from the group consisting of fluorooxyalkylene group-containing polymer-modified silanes of general formulas (1) to (4) below

  (1)

  (2)

  (3)

  (4)

and partial (co)hydrolyzates/condensates thereof in an amount of at least 50% of the total weight exclusive of diluting solvent, wherein the treatment has a percent weight loss after one hour of exposure at 250° C. that is not more than 10% of the total weight exclusive of diluting solvent.

In formulas (1) to (4), Rf is $-(CF_2)_d-(OCF_2)_p(OCF_2CF_2)_q(OCF_2CF_2CF_2)_r(OCF_2CF_2CH_2CH_2)_s(OCF(CF_3)CF_2)_t-O(CF_2)_d-$, each d being independently an integer from 0 to 5, p, q, r, s and t being each independently an integer from 0 to 500, with the proviso that the sum p+q+r+s+t=40 to 500, and each unit shown in parentheses being randomly bondable.

A is a fluorine atom, a hydrogen atom, or a monovalent fluorine-containing group having a terminal $-CF_3$ group, $-CF_2H$ group or $-CH_2F$ group.

Q is independently a single bond or a divalent organic group which may be fluorine-substituted and does not contain a hydrocarbon ether bond.

Z is independently a group selected from the group consisting of a single bond, the divalent group $-J_2C-$ (wherein J is independently an alkyl group, a hydroxyl group or the silyl ether group $K_3SiO-$ (K being independently a hydrogen atom, an alkyl group, an aryl group or an alkoxy group), the divalent group $-L_2Si-$ (wherein L is independently an alkyl group, an alkenyl group, an alkoxy group or a chloro group), the trivalent group $-JC\equiv$ (wherein J is as defined above), the trivalent group $-LSi\equiv$ (wherein L is as defined above), the tetravalent group $-C\equiv$, the tetravalent group $-Si\equiv$, and siloxane residues having a valence of 2 to 8.

W is independently a hydrolyzable group-bearing moiety of any of general formulas (5a) to (5e) below

  (5a)

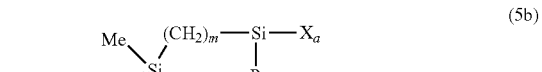  (5b)

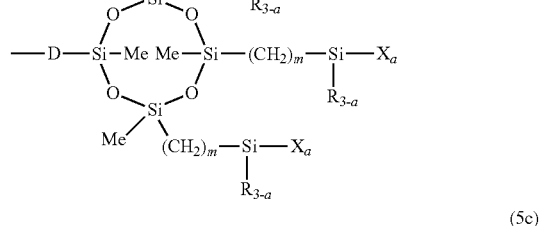  (5c)

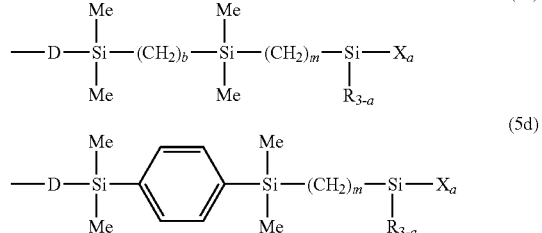  (5d)

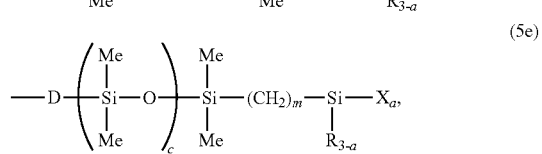  (5e)

wherein R is independently an alkyl group of 1 to 4 carbon atoms or a phenyl group, X is independently a hydrolyzable group, the letter "a" is 2 or 3, the letter "l" is an integer from 0 to 10, each m is independently an integer from 1 to 10, D is a single bond or a divalent organic group of 1 to 20 carbon atoms which may be fluorine-substituted, b is an integer from 2 to 6, c is an integer from 1 to 50, and Me is a methyl group.

Also, α is an integer from 1 to 7; Y is independently a divalent group having a hydrolyzable group; each β is an integer from 1 to 10; and B is independently a hydrogen atom, an alkyl group of 1 to 4 carbon atoms, or a halogen atom.

In formulas (3) and (4), Y is preferably selected from the group consisting of groups of general formulas (6) to (8) below

  (6)

-continued

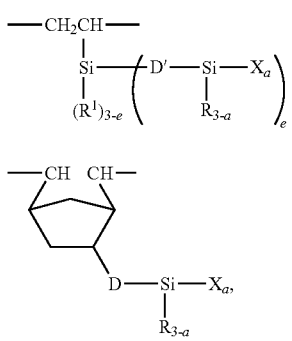
(7)

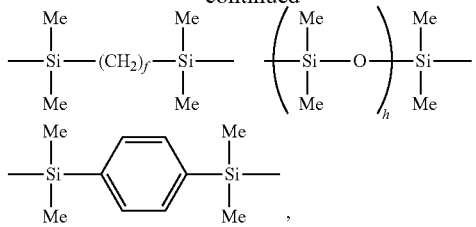

wherein f is an integer from 2 to 4, g is an integer from 1 to 4, h is an integer from 1 to 50, and Me is a methyl group.

In formulas (5a) to (5e), the hydrolyzable group X is preferably selected from the group consisting of alkoxy groups of 1 to 10 carbon atoms, alkoxyalkoxy groups of 2 to 10 carbon atoms, acyloxy groups of 1 to 10 carbon atoms, alkenyloxy groups of 2 to 10 carbon atoms, halogen groups, and silazane groups.

The treatment agent preferably further includes a fluorooxyalkylene group-containing polymer of general formula (9) below

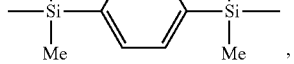

wherein Rf and A are as defined above, which fluorooxyalkylene group-containing polymer accounts for at least 0.1 wt % and not more than 50 wt % of the combined amount of the fluorooxyalkylene group-containing polymer-modified silane and/or partial (co)hydrolyzate/condensate thereof and the fluorooxyalkylene group-containing polymer.

In a second aspect, the present invention provides an article treated with the water/oil repellent treatment agent.

In a third aspect, the invention provides an optical article treated with the water/oil repellent treatment agent.

In a fourth aspect, the invention provides glass, chemically toughened glass, physically toughened glass, SiO$_2$-treated glass, sapphire glass, SiO$_2$-treated sapphire glass, a quartz substrate, a silicon wafer or a metal treated with the water/oil repellent treatment agent.

In a fifth aspect, the invention provides a touch panel, anti-reflective coating, wearable device, photovoltaic panel or transportation equipment window treated with the water/oil repellent treatment agent.

In a sixth aspect, the invention provides an imprinting mold treated with the water/oil repellent treatment agent.

In a seventh aspect, the invention provides a method of preparing the water/oil repellent treatment agent which includes thin-film distilling, in the temperature range of 150 to 400° C., the at least one compound selected from the group consisting of fluorooxyalkylene group-containing polymer-modified silanes of formulas (1) to (4) and partial (co)hydrolyzates/condensates thereof to remove low-boiling components.

In an eighth aspect, the invention provides a method of preparing the water/oil repellent treatment agent which includes thin-film distilling, in the temperature range of 150 to 400° C., a mixture of the at least one compound selected from the group consisting of fluorooxyalkylene group-containing polymer-modified silanes of formulas (1) to (4) and partial (co)hydrolyzates/condensates thereof with the fluorooxyalkylene group-containing polymer of formula (9) to remove low-boiling components.

In a ninth aspect, the invention provides a method of preparing the water/oil repellent treatment agent which includes separately thin-film distilling, in the temperature range of 150 to 400° C., the at least one compound selected from the group consisting of fluorooxyalkylene group-con- (8)

wherein R, X, the letter a and D are as defined above, D' is a divalent organic group of 1 to 10 carbon atoms that may be fluorine-substituted, $R^1$ is a monovalent hydrocarbon group of 1 to 20 carbon atoms, and e is 1 or 2.

In formulas (1) to (4), Q is preferably selected from the group consisting of a single bond and divalent groups of the following formulas

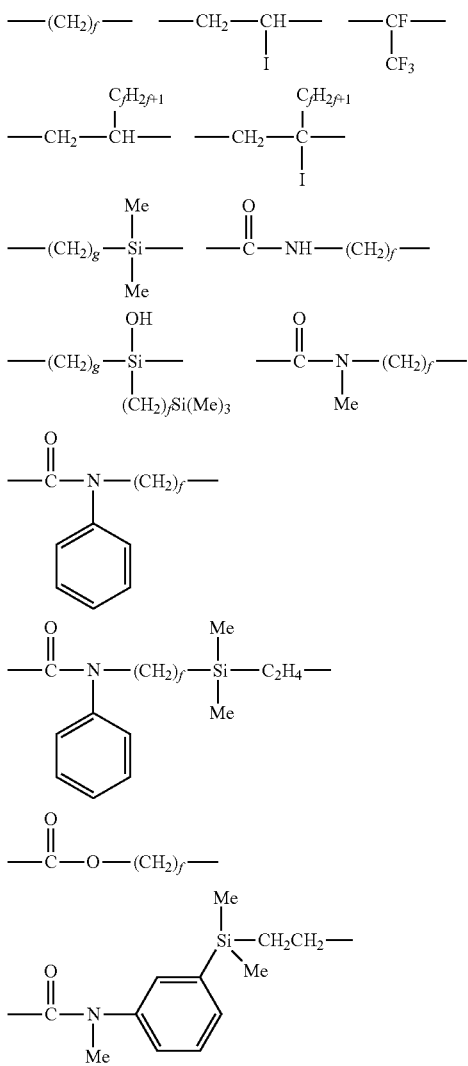

taining polymer-modified silanes of formulas (1) to (4) and partial (co)hydrolyzates/condensates thereof and the fluorooxyalkylene group-containing polymer of formula (9) to remove low-boiling components; and mixing together the residue from each distillation.

Advantageous Effects of the Invention

The water/oil repellent treatment agent of the invention is able to form a water/oil-repelling layer which has excellent water and oil repellency, abrasion resistance and mold release properties, and which, even after being heated at an elevated temperature of at least 250° C., retains excellent water and oil repellency, abrasion resistance and mold release properties. Accordingly, this may be used as a water/oil repellent treatment agent for treating substrates that are intended to pass through high-temperature processes at 250° C. or above, and for treating thermal imprinting molds.

DESCRIPTION OF THE PREFERRED EMBODIMENTS

The objects, features and advantages of the invention will become more apparent from the following detailed description.

The water/oil repellent treatment agent of the invention is characterized by having a percent weight loss after one hour of exposure at 250° C. that is not more than 10%, and preferably not more than 5%, of the total weight of the treatment exclusive of diluting solvent. Anti-smudge treated substrates obtained by spray-coating, inkjet-coating, spin-coating, dip-coating, vacuum deposition-coating or sputter-coating a water/oil repellent treatment agent which satisfies this condition onto glass, sapphire, a $SiO_2$-treated substrate (a substrate onto which $SiO_2$ has already been deposited or sputtered) or the like are able to exhibit excellent water and oil repellency, abrasion resistance and mold release properties even after passing through a high-temperature process at 250° C. or above. When a water/oil repellent treatment agent having a percent weight loss in excess of 10% is used, on exposure to a high-temperature process, film loss arises, adversely affecting the abrasion resistance and mold release properties.

In this invention, "percent weight loss" refers to the percent weight loss of undiluted water/oil repellent treatment agent (i.e., prior to dilution with a solvent) following one hour of exposure at standard pressure (atmospheric pressure) in a 250° C. dryer, relative to before such exposure. The type of dryer is not limited, although it is preferable to carry out testing with the dryer or heating furnace to be used in the process. In this embodiment, about 20 mg of sample is placed in an alumina sample pan having a diameter of 4.5 mm and a depth of 2 mm, and determination is carried out using a thermogravimetric analysis system to measure the weight following one hour of exposure at 250° C.

The water/oil repellent treatment agent of the invention includes at least one compound selected from the group consisting of fluorooxyalkylene group-containing polymer-modified silanes of general formulas (1) to (4) below and (co)hydrolyzates/condensates thereof in an amount of at least 50% of the total weight exclusive of diluting solvent.

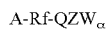    (1)

    (2)

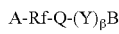    (3)

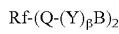    (4)

In formulas (1) to (4), Rf is $—(CF_2)_d—(OCF_2)_p(OCF_2CF_2)_q(OCF_2CF_2CF_2)_r(OCF_2CF_2CF_2CF_2)_s(OCF(CF_3)CF_2)_t—O(CF_2)_d—$, wherein each d is independently an integer from 0 to 5, p, q, r, s and t are each independently an integer from 0 to 500, with the proviso that the sum p+q+r+s+t=40 to 500, and each unit shown in parentheses may be randomly bonded.

A is a fluorine atom, a hydrogen atom, or a monovalent fluorine-containing group having a terminal —$CF_3$ group, —$CF_2H$ group or —$CH_2F$ group.

Q is independently a single bond or a divalent organic group which may be fluorine-substituted and does not contain a hydrocarbon ether bond;

Z is independently a group selected from the group consisting of a single bond, the divalent group -$J_2$C— (where J is independently an alkyl group, a hydroxyl group or the silyl ether group $K_3$SiO— (K being independently a hydrogen atom, an alkyl group, an aryl group or an alkoxy group), the divalent group -$L_2$Si— (where L is independently an alkyl group, an alkenyl group, an alkoxy group or a chloro group), the trivalent group -JC= (where J is as defined above), the trivalent group -LSi= (where L is as defined above), the tetravalent group —C≡, the tetravalent group —Si≡, and siloxane residues having a valence of 2 to 8.

W is independently a hydrolyzable group-bearing moiety of any of general formulas (5a) to (5e) below

    (5a)

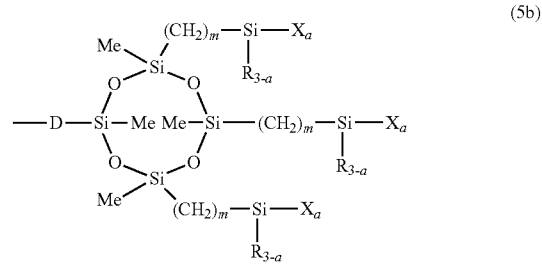    (5b)

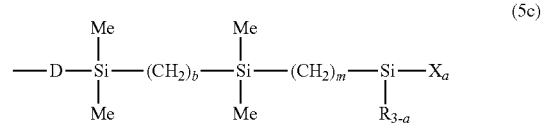    (5c)

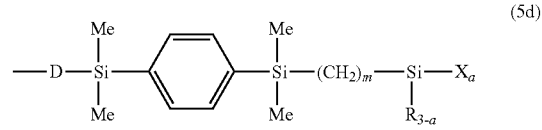    (5d)

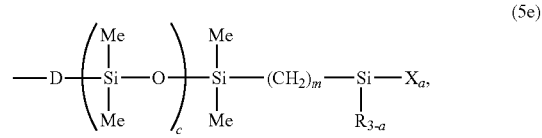    (5e)

wherein R is independently an alkyl group of 1 to 4 carbon atoms or a phenyl group, X is independently a hydrolyzable group, the letter "a" is 2 or 3, the letter "l" is an integer from 0 to 10, each m is independently an integer from 1 to 10, D is a single bond or a divalent organic group of 1 to 20 carbon atoms which may be fluorine-substituted, b is an integer from 2 to 6, c is an integer from 1 to 50, and Me is a methyl group.

Also, α is an integer from 1 to 7; Y is independently a divalent group having a hydrolyzable group; β is in each instance an integer from 1 to 10; and B is independently a hydrogen atom, an alkyl group of 1 to 4 carbon atoms, or a halogen atom.

In formulas (1) to (4), Rf, which is the backbone structure of the fluorooxyalkylene group-containing polymer, is represented by $-(CF_2)_d-(OCF_2)_p(OCF_2CF_2)_q(OCF_2CF_2CF_2)_r(OCF_2CF_2CF_2CF_2)_s(OCF(CF_3)CF_2)_t-O-(CF_2)_d-$.

Here, each d is independently an integer from 0 to 5, preferably an integer from 0 to 2, and more preferably 1 or 2. The letters p, q, r, s and t are each independently an integer from 0 to 500, with p being preferably an integer from 20 to 400, q being preferably an integer from 20 to 400, and r, s and t being preferably each independently integers from 0 to 500; r is more preferably an integer from 0 to 50, s is more preferably an integer from 0 to 50, and t is more preferably an integer from 0 to 50. The sum p+q+r+s+t is an integer from 40 to 500, preferably an integer from 60 to 400, and more preferably an integer from 80 to 200. Each unit shown in parentheses may be randomly bonded. When the sum p+q+r+s+t is smaller than the lower limit above, the amount of low-boiling components increases and the percent weight loss on heating at 250° C. or above rises. When this sum is larger than the upper limit, preparation of the treatment is difficult.

Rf is exemplified by the following

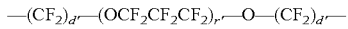

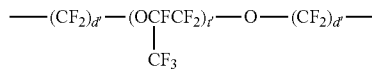

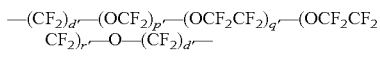

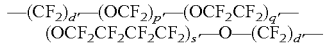

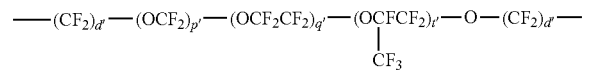

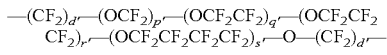

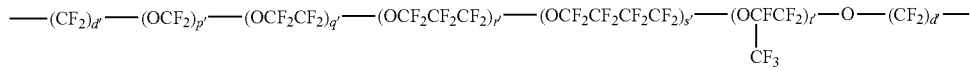

In these formulas, d' is the same as d, p' is the same as p, q' is the same as q, and r', s' and t' are each integers of 1 or more with upper limits that are the same as the upper limits for, respectively, r, s and t.

In above formulas (1) and (3), A is a fluorine atom, hydrogen atom, or a monovalent fluorine-containing group having a terminal $-CF_3$ group, $-CF_2H$ group or $-CH_2F$ group. Of these, a $-CF_3$ group, $-CF_3CF_3$ group or $-CF_2CF_2CF_3$ group is preferred.

In above formulas (1) to (4), Q is independently a single bond or a divalent organic group which may be fluorine-substituted and does not contain a hydrocarbon ether bond, and serves as a linkage between the Rf group and an end group. Q is preferably an amide bond, an ester bond, or an unsubstituted or substituted divalent organic group of 2 to 12 carbon atoms which may include one, two or more structures selected from among diorganosilylene groups such as dimethylsilylene, diethylsilylene and diphenylsilylene groups, $-Si[OH][(CH_2)_f Si(CH_3)_3]-$ (wherein f is an integer from 2 to 4), and diorganosiloxane groups; and is more preferably an unsubstituted or substituted divalent hydrocarbon group of 2 to 12 carbon atoms which may include the foregoing structures.

Here, the unsubstituted or substituted divalent hydrocarbon group of 2 to 12 carbon atoms may be an alkylene group such as an ethylene, propylene (trimethylene, methylethylene), butylene (tetramethylene, methylpropylene), hexamethylene or octamethylene group; an arylene group such as a phenylene group; or a combination of two or more of these groups (e.g., alkylene/arylene groups). Additional examples are any of the foregoing groups in which some or all of the hydrogen atoms on these groups are substituted with halogen atoms such as fluorine, chlorine, bromine or iodine. Of these, unsubstituted or substituted alkyl groups of 2 to 4 carbon atoms and phenyl groups are preferred.

Q is exemplified by the following groups.

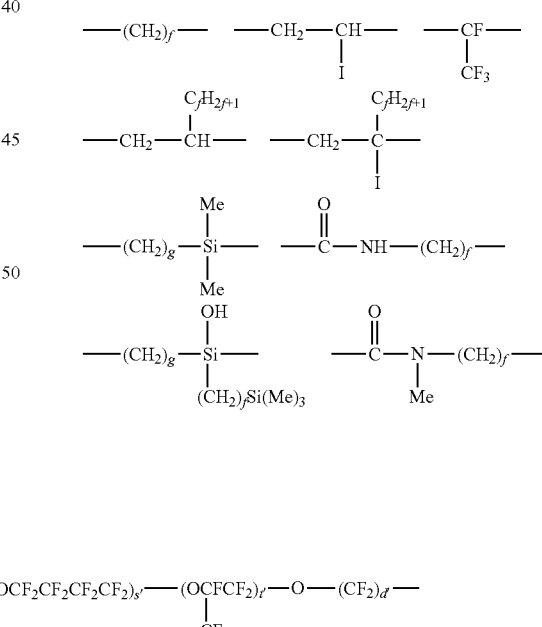

-continued

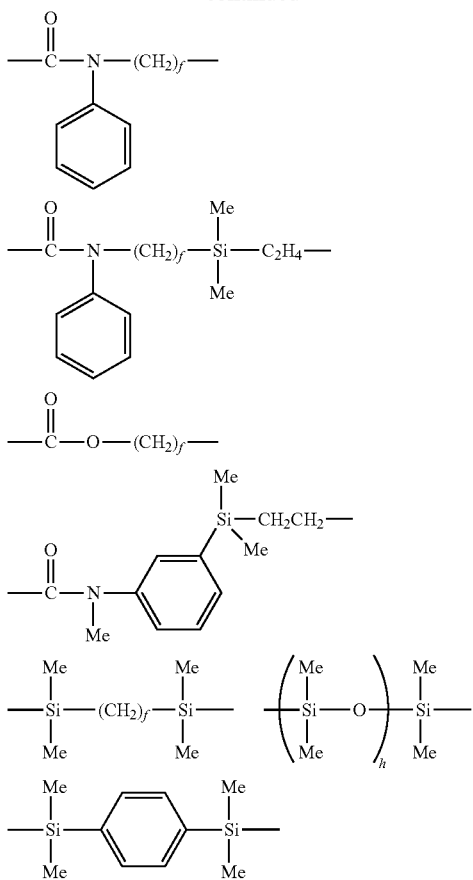

In these formulas, f is an integer from 2 to 4, g is an integer from 1 to 4, h is an integer from 1 to 50, and Me is a methyl group.

In formulas (1) and (2), Z is independently a group selected from among a single bond, the divalent group -J$_2$C— (wherein J is, independently, preferably an alkyl group of 1 to 3 carbon atoms, a hydroxyl group or the silyl ether group K$_3$SiO— (K being independently a hydrogen atom, an alkyl group of preferably 1 to 3 carbon atoms, an aryl group such as a phenyl group, or an alkoxy group of preferably 1 to 3 carbon atoms), the divalent group -L$_2$Si— (wherein L is, independently, preferably an alkyl group of 1 to 3 carbon atoms, an alkenyl group of 2 or 3 carbon atoms, an alkoxy group of 1 to 3 carbon atoms, or a chloro group), the trivalent group -JC≡ (wherein J is as defined above), the trivalent group -LSi≡ (wherein L is as defined above), the tetravalent group —C≡, the tetravalent group —Si≡, and siloxane residues having a valence of 2 to 8. In cases where a siloxane bond is included, an acrylic, branched or cyclic organopolysiloxane residue having 2 to 13 silicon atoms, and preferably 2 to 5 silicon atoms, is preferred. A silalkylene structure in which two silicon atoms are bonded together through an alkylene group, i.e., Si—(CH$_2$)$_n$—Si, may be included (in this formula, n is an integer from 2 to 6).

It is desirable for the organopolysiloxane residue to have an alkyl group of 1 to 8 carbon atoms, and preferably 1 to 4 carbon atoms, such as methyl, ethyl, propyl or butyl, or a phenyl group. The alkylene group in the silalkylene bond is preferably one having 2 to 6 carbon atoms, and more preferably 2 to 4 carbon atoms.

Examples include the following.

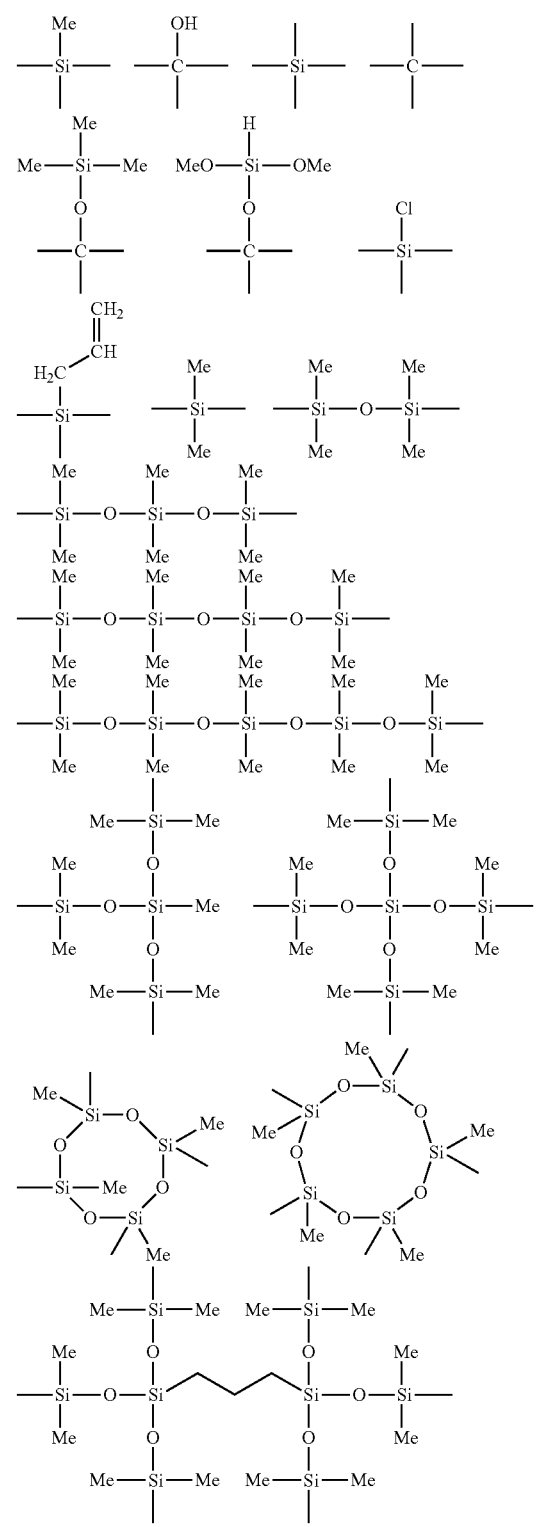

In these formulas, Me represents a methyl group.

In formulas (1) and (2), W is selected from among hydrolyzable group-bearing moieties of general formulas (5a) to (5e) below

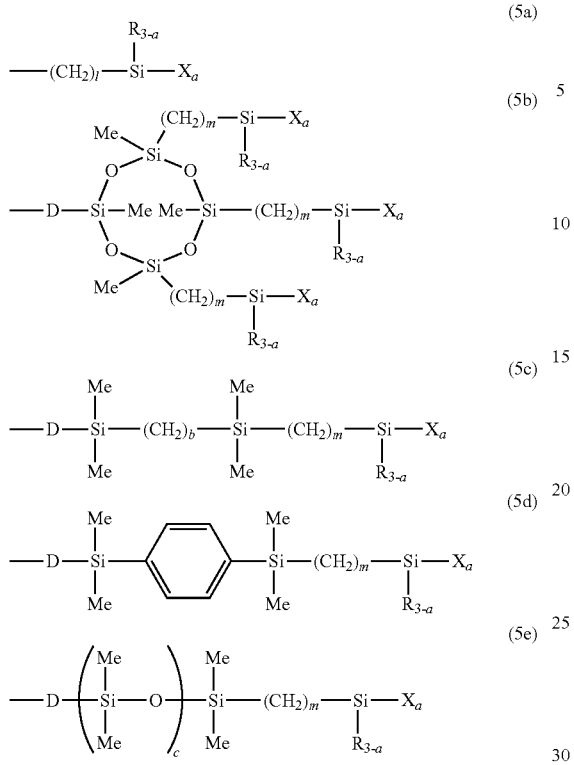

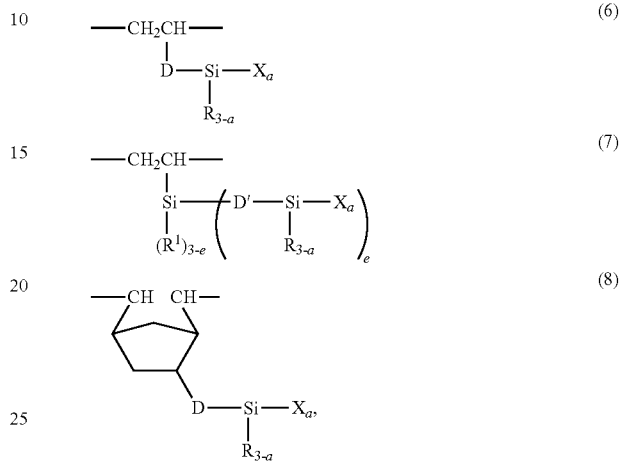

Here, R is independently an alkyl group of 1 to 4 carbon atoms or a phenyl group, X is independently a hydrolyzable group, the letter "a" is 2 or 3, the letter "l" is an integer from 0 to 10, each m is independently an integer from 1 to 10, D is a single bond or a divalent organic group of 1 to 20 carbon atoms which may be fluorine-substituted, b is an integer from 2 to 6, c is an integer from 1 to 50, and Me is a methyl group.

In formulas (5a) to (5e), R represents an alkyl group of 1 to 4 carbon atoms, such as a methyl, ethyl, propyl or butyl group, or a phenyl group.

X represents hydrolyzable groups which may differ from each other. Illustrative examples of X include alkoxy groups of 1 to 10 carbon atoms, such as methoxy, ethoxy, propoxy and butoxy groups; alkoxyalkoxy groups of 2 to 10 carbon atoms, such as methoxymethoxy and methoxyethoxy groups; acyloxy groups such as an acetoxy group; alkenyloxy groups of 2 to 10 carbon atoms such as an isopropenoxy group; halogen groups such as chloro, bromo and iodo groups; and silazane groups. Of these, methoxy, ethoxy, isopropenoxy and chloro groups are preferred.

D is a single bond or a divalent organic group of 1 to 20 carbon atoms, and preferably 2 to 8 carbon atoms, which may be fluorine-substituted, and is preferably a divalent hydrocarbon group. Illustrative examples of divalent hydrocarbon groups include alkylene groups such as methylene, ethylene, propylene(trimethylene, methylethylene), butylene(tetramethylene, methylpropylene), hexamethylene and octamethylene; arylene groups such as a phenylene group; combinations of two or more types of such groups (e.g., alkylene/arylene groups), and any of these groups in which some or all of the hydrogen atoms are substituted with fluorine atoms. D is preferably an ethylene, propylene or phenylene group.

The letter "l" is an integer from 0 to 10, preferably from 2 to 8; m is an integer from 1 to 10, preferably from 2 to 8; b is an integer from 2 to 6, preferably from 2 to 4; and c is an integer from 1 to 50, preferably from 1 to 10.

In formulas (1) and (2), α is an integer from 1 to 7, and preferably an integer from 1 to 3.

In formulas (3) and (4), Y is independently a hydrolyzable group-bearing divalent group, and preferably a group of general formula (6), (7) or (8) below.

In formulas (6) to (8), R, X, a and D are as defined above, D' is a divalent organic group of 1 to 10 carbon atoms which may be fluorine-substituted, $R^1$ is a monovalent hydrocarbon group of 1 to 20 carbon atoms, and e is 1 or 2.

Here, R, X, a and D are exemplified in the same way as above.

D' is a divalent organic group of 1 to 10 carbon atoms, and preferably 2 to 8 carbon atoms, which may be fluorine-substituted, and is preferably a divalent hydrocarbon group. Examples of divalent hydrocarbon groups include alkylene groups such as methylene, ethylene, propylene(trimethylene, methylethylene), butylene(tetramethylene, methylpropylene), hexamethylene and octamethylene groups; arylene groups such as a phenylene group; and combinations of two or more types of such groups (e.g., alkylene/arylene groups). Some or all hydrogen atoms on these groups may be substituted with fluorine atoms. D' is preferably an ethylene or propylene group.

$R^1$ is a monovalent hydrocarbon group of 1 to 20 carbon atoms, and preferably 1 to 10 carbon atoms. Examples of monovalent hydrocarbon groups include alkyl groups such as methyl, ethyl, propyl, isopropyl, butyl, isobutyl, tert-butyl, pentyl, neopentyl, hexyl and octyl groups; cycloalkyl groups such as a cyclohexyl group; alkenyl groups such as vinyl, allyl and propenyl groups; aryl groups such as phenyl and tolyl groups; and aralkyl groups such as benzyl, phenylethyl and phenylpropyl groups. Of these, a methyl group is preferred.

Y is exemplified by the following groups.

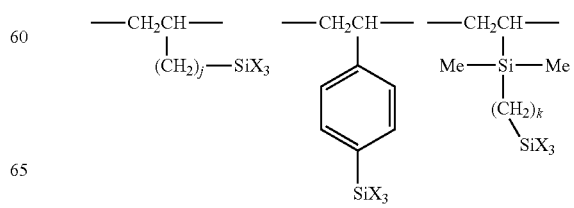

-continued

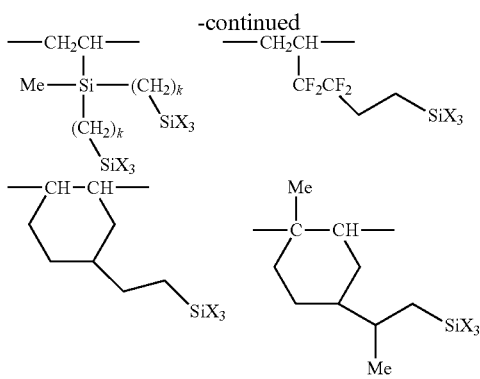

In these formulas, X is as defined above; j is an integer from 0 to 10, preferably from 1 to 8; k is an integer from 2 to 10, preferably from 3 to 8; and Me is a methyl group.

In formulas (3) and (4), β is an integer from 1 to 10, and preferably from 1 to 4. Also, B is independently a hydrogen atom, an alkyl group of 1 to 4 carbon atoms, such as a methyl, ethyl, propyl or butyl group, or a halogen atom such as a fluorine, chlorine, bromine or iodine atom.

The fluorooxyalkylene group-containing polymer-modified silane structure of formulas (1) to (4) is exemplified by the following structures. A number of different fluorooxyalkylene group-containing polymer-modified silanes can be obtained by changing the combinations of A, B, Rf, Q, Z, W, Y, α and β in formulas (1) to (4).

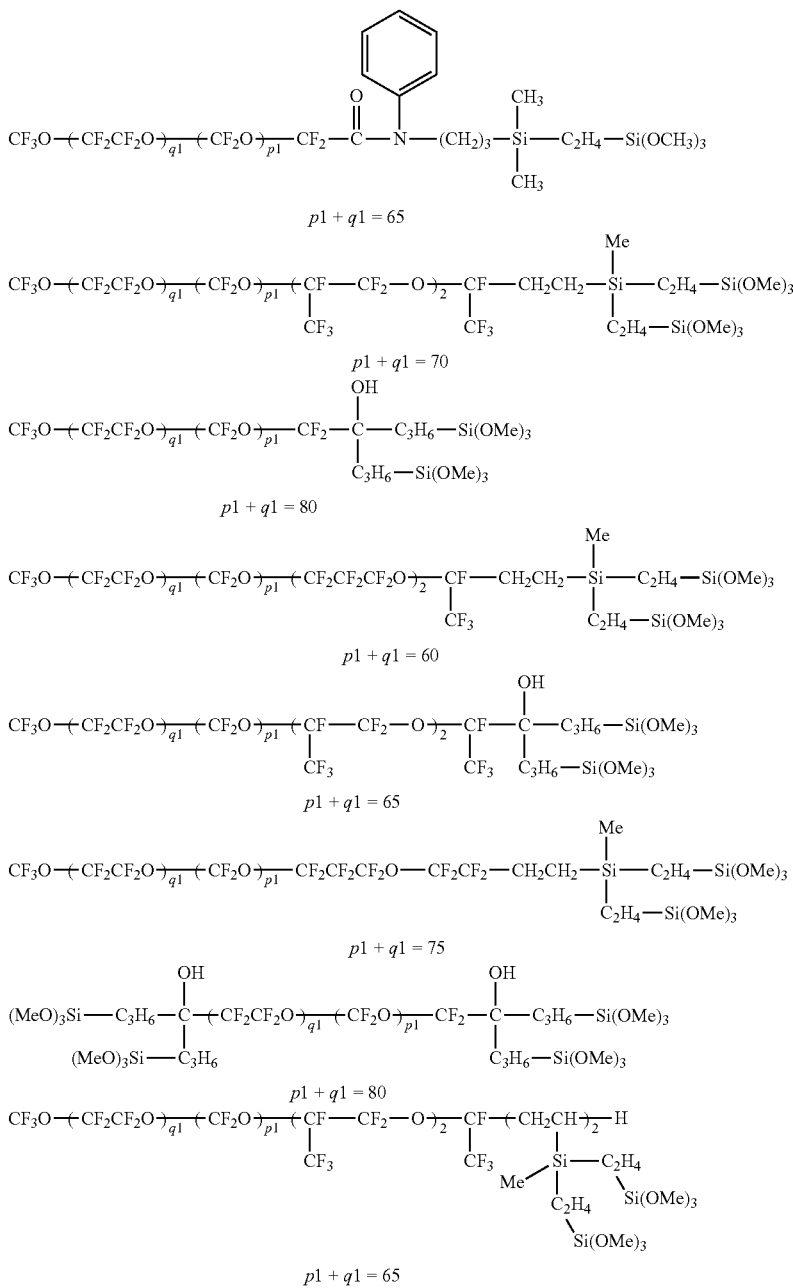

-continued
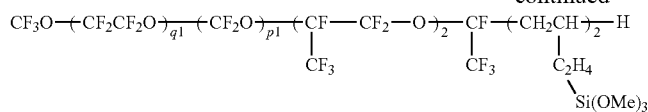
$p1 + q1 = 80$
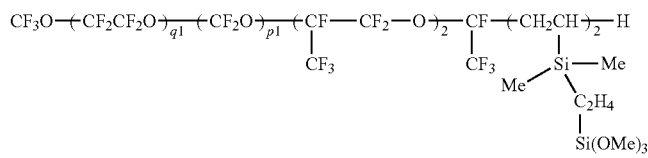
$p1 + q1 = 70$
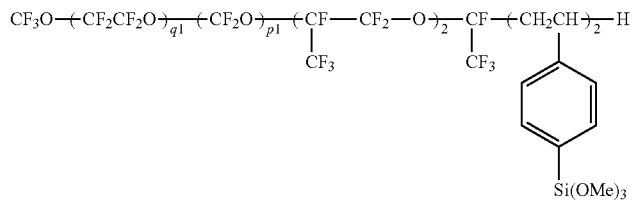
$p1 + q1 = 70$
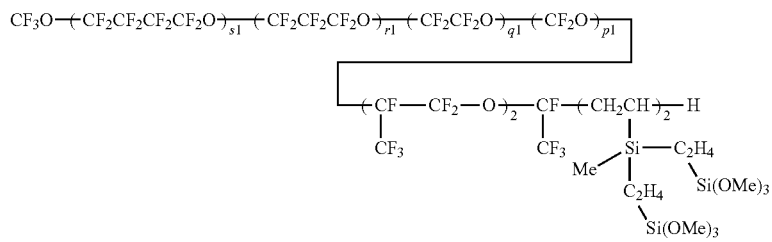
$p1 + q1 + r1 + s1 = 80$
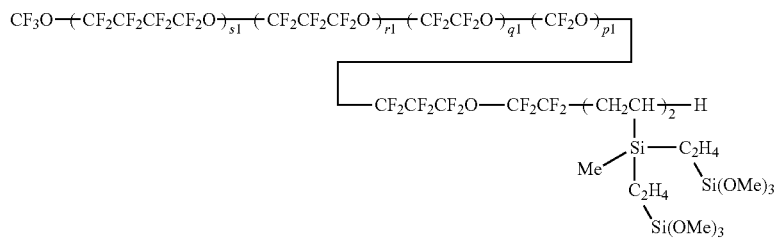
$p1 + q1 + r1 + s1 = 80$
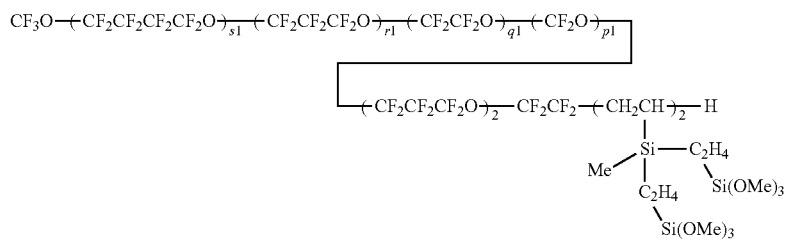
$p1 + q1 + r1 + s1 = 80$
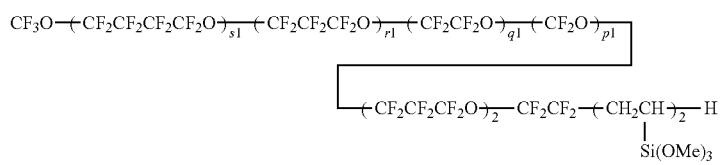
$p1 + q1 + r1 + s1 = 80$ -continued

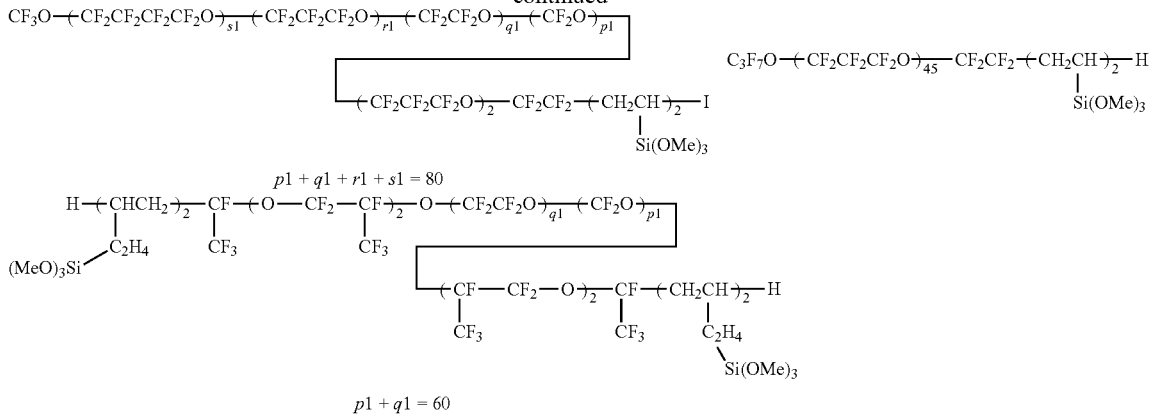

$p1 + q1 + r1 + s1 = 80$ $p1 + q1 = 60$

In these formulas, Me represents a methyl group, and each unit shown in parentheses may be randomly bonded.

The water/oil repellent treatment agent of the invention may include a partial (co)hydrolyzate/condensate obtained by using a known method to carry out in advance the partial hydrolysis and condensation of terminal hydrolyzable groups on the fluorooxyalkylene group-containing polymer-modified silane. Also, it is preferable for the number of polymer chains included in a single (co)hydrolyzate/condensate to be 3 or less. When this is more than 3, the reactivity with the substrate may worsen.

The number-average molecular weight of the fluorooxyalkylene group-containing polymer-modified silane and/or a partial (co)hydrolyzate/condensate thereof is preferably from 4,000 to 100,000, and more preferably from 5,000 to 15,000. However, when the content of low-boiling components is small, the number-average molecular weight is not limited to the above range. Even at the same number-average molecular weight, when the efficiency of low-boiling component removal in a purifying step such as thin-film distillation differs, the weight loss due to heating also differs. Here and below, the number-average molecular weight is the value determined by $^{19}$F-NMR analysis.

In cases where the fluorooxyalkylene group-containing polymer-modified silane and/or partial (co)hydrolyzate/condensate thereof has a percent weight loss, exclusive of diluting solvent, after one hour of exposure in a 250° C. dryer that exceeds 10%, by removing low-boiling components, it can made to withstand back-end heating steps at 250° C. The heating temperature here is not limited to 250° C.; suitable temperatures may be selected as appropriate for each heating step. The manner in which low-boiling components are removed may be suitably selected according to the conditions.

As used herein, "low-boiling components" refers to, of the ingredients exclusive of diluting solvent, ingredients that evaporate upon one hour of exposure at 250° C.

Low-boiling components can, in a high-temperature heated state, be removed by vacuum distillation or nitrogen gas bubbling, although this is undesirable from the standpoint of heat history. Removal by thin-film distillation is preferred. For example, a pot molecular distillation still, falling-film molecular distillation still, centrifugal molecular distillation still, thin-film distillation still or thin-film evaporator may be used. Thin-film distillation is preferable because low-boiling components can be removed at lower temperatures as the degree of vacuum increases. It is desirable to carry out such distillation under a vacuum of 10 Pa or less, and preferably from $1.0 \times 10^{-3}$ to 0.5 Pa, and at a temperature of from 150 to 400° C., and preferably from 200 to 300° C. The vacuum pump used may be selected as appropriate, although suitable examples include a rotary pump, diffusion pump and turbo pump.

A fluorooxyalkylene group-containing polymer-modified silane of any of formulas (1) to (4) may be synthesized using a polymer already containing a low level of low-boiling components. In cases where a fluorooxyalkylene group-containing polymer-modified silane of any of formulas (1) to (4) is synthesized using a polymer containing a high level of low-boiling components, the process should include, at any stage of preparation, a step like that described above for removing low-boiling components.

The water/oil repellent treatment agent of the invention includes the fluorooxyalkylene group-containing polymer-modified silane and/or a partial (co)hydrolyzate/condensate thereof in an amount of at least 50%, and preferably from 60 to 100%, of the total weight exclusive of diluting solvent. When this amount is too low, the abrasion resistance worsens.

The inventive water/oil repellent treatment agent may further include a fluorooxyalkylene group-containing polymer of general formula (9) below (also referred to below as a "nonfunctional polymer"):

A-Rf-A  (9)

wherein Rf and A are as defined above.

In formula (9). Rf and A are exemplified in the same way as above. In the Rf moiety here in formula (9), which may be the same as or different from the Rf moiety in formulas (1) to (4) above, the combined number of recurring units represented by p+q+r+s+t is preferably from 60 to 400, and especially from 80 to 300. Also, A is preferably —CF$_3$, —CF$_2$CF$_3$, —CF$_2$CF$_2$CF$_3$, —CF$_2$H or —CH$_2$F.

Preferred examples of the nonfunctional polymer of formula (9) include, but are not limited to, those of formulas (10) and (11) below:

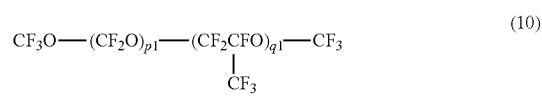 (10)

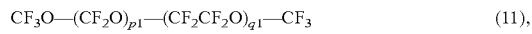 (11), wherein p1 and q1 are numbers such that the number of recurring units on the fluorooxyalkylene group-containing polymer is from 40 to 500.

The fluorooxyalkylene group-containing polymer may be a commercial product, examples of which include products sold under the trademark FOMBLIN that are readily available.

Examples of such polymers include those having the structures shown below.

FOMBLIN Y (available under this trade name from Solvay Solexis), such as FOMBLIN Y25 (number-average molecular weight, 3,300) and FOMBLIN Y45 (number-average molecular weight, 4,300):

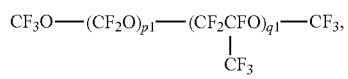

wherein p1 and q1 are numbers which satisfy the above-indicated average molecular weights.

FOMBLIN Z (available under this trade name from Solvay Solexis), such as FOMBLIN Z03 (number-average molecular weight, 4,100), FOMBLIN Z15 (number-average molecular weight, 8,200) and FOMBLIN Z25 (number-average molecular weight, 9,700); and FOMBLIN M (available under this trade name from Solvay Solexis), such as FOMBLIN M07 (number-average molecular weight, 5,400) and FOMBLIN M30 (number-average molecular weight, 16,000):

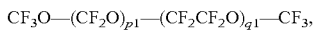

wherein p1 and q1 are numbers which satisfy the above-indicated average molecular weights.

When a nonfunctional polymer is used in the water/oil repellent treatment agent, the amount thereof, based on the combined amount of the fluorooxyalkylene group-containing polymer and/or partial (co)hydrolyzate/condensate thereof and the nonfunctional polymer, is preferably at least 0.1 wt % and not more than 50 wt %, and more preferably at least 0.1 wt % and not more than 40 wt %. At a nonfunctional polymer content larger than this upper limit, the abrasion resistance may worsen.

When intentionally mixing in the nonfunctional polymer, it is preferable to remove low-boiling components in the same way as for the fluorooxyalkylene group-containing polymer-modified silane and/or partial (co)hydrolyzate/condensate thereof. Alternatively, it is efficient and thus desirable to carry out a purification operation in which low-boiling components are removed following mixture of the fluorooxyalkylene group-containing polymer-modified silane and/or partial (co)hydrolyzate/condensate thereof with the nonfunctional polymer.

Commercial nonfunctional polymers sometimes contain a high level of low-boiling components, in which case it is preferable to remove the low-boiling components by a purification process similar to that used for the fluorooxyalkylene group-containing polymer-modified silane and/or partial (co)hydrolyzate/condensate thereof.

The water/oil repellent treatment agent is preferably dissolved in a suitable solvent prior to being applied. Illustrative examples of solvents suitable for this purpose include fluorine-modified aliphatic hydrocarbon solvents such as pentafluorobutane, perfluorohexane, perfluoroheptane, perfluorooctane, perfluorocyclohexane and perfluoro-1,3-dimethylcyclohexane; fluorine-modified aromatic hydrocarbon solvents such as m-xylenehexafluoride, benzotrifluoride and 1,3-trifluoromethylbenzene; fluorine-modified ether solvents such as methyl perfluoropropyl ether, methyl perfluorobutyl ether, ethyl perfluorobutyl ether, perfluoro(2-butyltetrahydrofuran) and methoxyperfluoroheptene; fluorine-modified alkylamine solvents such as perfluorotributylamine and perfluorotripentylamine; hydrocarbon solvents such as petroleum benzin, mineral spirits, toluene and xylene; ketone solvents such as acetone, methyl ethyl ketone and methyl isobutyl ketone; ether solvents such as tetrahydrofuran and diethyl ether; ester solvents such as ethyl acetate; and alcohol solvents such as isopropyl alcohol. Of these, fluorine-modified solvents are preferred in terms of properties such as solubility and wettability, with ethyl perfluorobutyl ether, decafluoropentane, pentafluorobutane and perfluorohexane being especially preferred. One of these solvents may be used alone, or two or more may be used in admixture.

The optimal concentration of the water/oil repellent treatment agent dissolved in solvent varies depending on the treatment method, although it is preferable for the level of ingredients exclusive of the solvent (solids concentration) to be from 0.01 to 50 wt %, and especially from 0.03 to 20 wt %.

Where necessary, the water/oil repellent treatment agent may include various additives within ranges that do not detract from the objects of the invention. Illustrative examples include hydrolysis/condensation catalysts such as organotin compounds (e.g., dibutyltin dimethoxide, dibutyltin dilaurate), organotitanium compounds (e.g., tetra-n-butyl titanate), organic acids (e.g., fluorocarboxylic acids, acetic acid, methanesulfonic acid), and inorganic acids (e.g., hydrochloric acid, sulfuric acid). Of these, fluorocarboxylic acids, acetic acid, tetra-n-butyl titanate or dibutyltin dilaurate are especially preferred.

The amount of catalyst added per 100 parts by weight of the fluorooxyalkylene group-containing polymer is typically from 0.01 to 5 parts by weight, and more preferably from 0.1 to 1 part by weight.

The water/oil repellent treatment agents may be applied to a substrate by various well-methods, such as a wet coating process (e.g., brush coating, dipping, spraying, inkjet printing), vapor deposition or sputtering. However, the water-oil repellent treatment agent of the invention is more effective when applied in particular by spray coating, spin coating, vapor deposition coating or sputter coating. The curing temperature varies with the curing process, but is preferably in the range of 20 to 200° C. As for the curing humidity, carrying out curing under moistened conditions is desirable for promoting the reaction. The thickness of the cured coat is selected as appropriate for the type of substrate, but is typically from 0.1 to 100 nm, preferably from 2 to 30 nm, and more preferably form 3 to 15 nm.

The substrate treated with the water/oil repellent treatment agent is not particularly limited, and may be made of various types of materials, such as metals and metal oxides, glass, chemically toughened, physically toughened or $SO_2$-treated glass, plastic, ceramic, quartz, sapphire glass, $SiO_2$-treated sapphire glass and silicon wafers. The water/oil repellent treatment agent is able to confer these substrate materials with water and oil repellency, abrasion resistance and mold release properties. The surface of the substrate may be hardcoat treated or anti-reflection treated. When adherence is poor, it may be improved by a well-known method such as providing a $SiO_2$ layer or a hydrolyzable group or SiH group-containing silane coupling agent layer as a primer layer, or applying vacuum plasma treatment, atmospheric-pressure plasma treatment, alkali treatment or acid treatment.

Because the water/oil repellent treatment agent of the invention has hydrolyzable groups, it is desirable to provide a $SiO_2$ layer as a primer on the substrate, and to coat the water/oil repellent treatment agent thereon. Alternatively, in the case of glass substrates and the like where hydrolyzable groups are able to adhere directly to the substrate, desirable effects may be achieved without providing a $SiO_2$ layer.

Articles that may be treated with the water/oil repellent treatment agent of the invention include touch panel displays used in, for example, car navigation systems, car audio systems, tablet PC's, smart phones, wearable devices, mobile phones, digital cameras, digital video cameras, PDA's, portable audio players, game consoles, various types of control panels and electronic signage; and also antireflective coatings, photovoltaic panels, transportation equipment windows and imprinting molds. The water/oil repellent treatment agent of the invention, because it can prevent fingerprints and finger oils from adhering to the article and can also impart scuff and scratch resistance, is particularly useful as a water/oil-repelling layer on touch panel displays. Substrates that have been treated with the water/oil repellent treatment agent of the invention retain these effects even after passing through high-temperature processes, thus making the inventive treatment particularly effective for water/oil-repellency treating glass equipped with touch sensors, and for release-treating thermal imprinting molds.

EXAMPLES

Preparation Examples, Working Examples and Comparative Examples are given below by of illustration and not by way of limitation.

The following compositions were prepared as water/oil repellent treatment agents.

Preparation Example 1

A 100 mL three-neck flask fitted with a Dimroth condenser, a dropping funnel, a thermometer and a magnetic stirrer was charged with 30 g of the iodo-terminated fluorinated compound having the average compositional formula (1a) below (number-average molecular weight, 3,700; iodo group concentration=0.026 mol/100 g), 1.12 g of di-t-butyl peroxide, 11.5 g of a vinyl group-containing silane compound (1b) (vinyl group concentration=0.272 mol/100 g), and 30 g of 1,3-bistrifluoromethylbenzene, and the flask interior was flushed with nitrogen. Reaction was carried out at 100° C. for 3 hours under stirring, followed by cooling to room temperature (20° C.). Next, 1.02 g of zinc powder and 30 g of methyl alcohol were added and the reaction was carried out for 12 hours at an internal temperature of 60° C. and under vigorous stirring. The reaction mixture was filtered to remove the solids, and then subjected to stripping treatment under conditions of 100° C./1 mmHg to remove solvent components, unreacted silane and low-boiling components, giving 28 g of a product of formula (1c) below. FT-IR, $^1$H-NMR and $^{19}$F-NMR analysis confirmed the loss of the terminal iodine group, the loss of the vinyl group and the presence of methoxy groups. This product is referred to below as Composition 1-1.

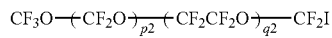
(1a)

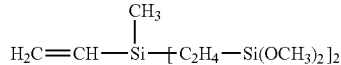
(1b)

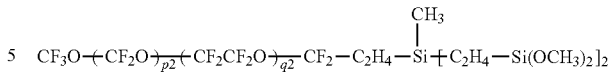
(1c)

Here, $p2/q2≈1.1$ and $p2+q2≈38$.

Preparation Example 2

Composition 1-1 was subjected to thin-film distillation at $1×10^{-2}$ Pa and 130° C. to remove low-boiling components. The resulting composition was designated as Composition 1-2. The yield was 85%. In formula (1c), $p2/q2≈1.1$ and $p2+q2≈43$.

Preparation Example 3

Composition 1-1 was subjected to thin-film distillation at $1×10^{-2}$ Pa and 220° C. to remove low-boiling components. The resulting composition was designated as Composition 1-3. The yield was 68%. In formula (1c), $p2/q2≈1.1$ and $p2+q2≈64$.

Preparation Example 4

Composition 1-1 was subjected to thin-film distillation at $1×10^{-2}$ Pa and 300° C. to remove low-boiling components. The resulting composition was designated as Composition 1-4. The yield was 36%. In formula (1c), $p2/q2≈1.1$ and $p2+q2≈81$.

Preparation Example 5

A 100 mL three-neck flask fitted with a Dimroth condenser, a dropping funnel, a thermometer and a magnetic stirrer was charged with 30 g of the carbonyl-containing fluorinated compound of the average compositional formula (2a) below (number-average molecular weight, 3,700; carbonyl group concentration=0.028 mol/100 g), 15 g of a diethyl ether solution of allylmagnesium bromide (bromo group concentration, 0.05 mol/100 g), 30 g of 1,3-bistrifluoromethylbenzene and 10 g of tetrahydrofuran, and the flask interior was flushed with nitrogen. Reaction was carried out at 60° C. for 6 hours under stirring, followed by cooling to room temperature (20° C.). Next, the reaction mixture was slowly added to a separatory funnel containing an aqueous hydrochloric acid (a mixture of 6 g of 12 N hydrochloric acid and 54 g of water) and the contents were stirred 30 minutes, following which the bottom phase was recovered. The recovered liquid was subjected to stripping treatment under 110° C./1 mmHg conditions to remove the solvent components, giving 25 g of a product of formula (2b) below. FT-IR, $^1$H-NMR and $^{19}$F-NMR analysis confirmed the loss of the methyl ester group and the presence of allyl groups.

The resulting product of formula (2b) was subjected to thin-film distillation at $1×10^{-2}$ and 300° C. to remove low-boiling components. The yield was 37%.

Next, a reaction vessel was charged with 20 g of the product from which low-boiling components had been removed by thin-film distillation and 0.04 g of a toluene solution of the catalyst obtained by modifying chloroplatinic acid with 1,3-divinyl-1,1,3,3-tetramethyldisiloxane (platinum concentration, 0.5 wt %), and the contents were heated to an internal temperature of 80° C. under stirring.

Trimethoxysilane (SiH group concentration=0.0082 mol/g), 2.8 g, was added dropwise over about 10 minutes from a dropping funnel, and maturing was carried out for 2 hours at an internal temperature of 80 to 90° C. This was followed by stripping treatment at 100° C./5 mmHg to remove surplus silane, giving 21 g of the product of formula (2c) below. FT-IR, $^1$H-NMR and $^{19}$F-NMR analysis confirmed the loss of the allyl groups and the loss of the SiH group. This product is referred to below as Composition 2-1.

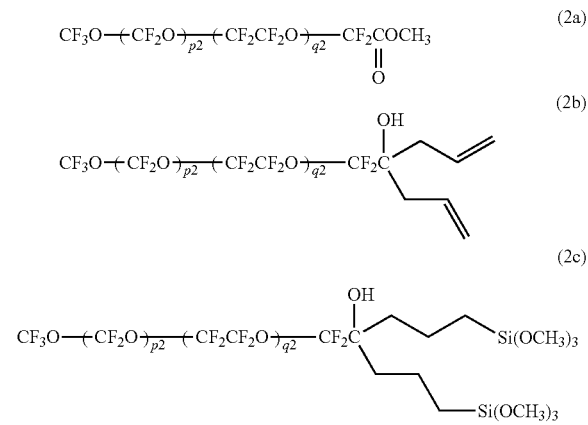

In formulas (2a) to (2c), p2/q2≈1.1 and p2+q2≈78.

Preparation Example 6

The compound of formula (2a) was subjected to thin-film distillation at 1×10$^{-2}$ Pa and 300° C. to remove low-boiling components, whereupon the yield was 40%. Aside from using the product thus recovered instead of the compound of formula (2a) in Preparation Example 5 and eliminating the thin-film distillation step, a compound to which trimethoxysilane had been added (2c) was obtained by the same method as in Preparation Example 5. In formula (2c), p2/q2≈1.1 and p2+q2≈79. This product is referred to below as Composition 3-1.

Preparation Example 7

A 100 mL three-neck flask fitted with a Dimroth condenser, a dropping funnel, a thermometer and a magnetic stirrer was charged with 30 g of the allyl-terminated fluorinated compound of the average compositional formula (3a) below (number-average molecular weight, 3,700; allyl group concentration=0.026 mol/100 g) and 0.05 g of a toluene solution of the catalyst obtained by modifying chloroplatinic acid with 1,3-divinyl-1,1,3,3-tetramethyldisiloxane (platinum concentration, 0.5 wt %), and the contents were heated to an internal temperature of 80° C. under stirring. Trimethoxysilane (SiH group concentration=0.0082 mol/g), 1.2 g, was added dropwise over about 5 minutes from a dropping funnel, and maturing was carried out for 2 hours at an internal temperature of 80 to 90° C. This was followed by stripping treatment at 100° C./5 mmHg to remove surplus silane, giving 31 g of the product of formula (3b) below. FT-IR, $^1$H-NMR and $^{19}$F-NMR analysis confirmed the loss of the allyl groups and the loss of the SiH group. This product is referred to below as Composition 4-1.

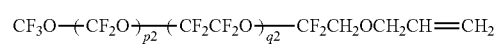

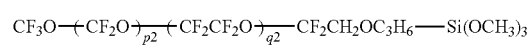

In formulas (3a) and (3b), p2/q2≈1.0 and p2+q2≈38.

Preparation Example 8

Composition 4-1 was subjected to thin-film distillation at 1×10$^{-2}$ Pa and 130° C. to remove low-boiling components. The resulting composition was designated as Composition 4-2. The yield was 81%. In formula (3b), p2/q2≈1.1 and p2+q2≈45.

Preparation Example 9

Composition 4-1 was subjected to thin-film distillation at 1×10$^{-2}$ Pa and 220° C. to remove low-boiling components. The resulting composition was designated as Composition 4-3. The yield was 55%. In formula (3b), p2/q2≈1.1 and p2+q2≈69.

Preparation Example 10

Composition 4-1 was subjected to thin-film distillation at 1×10$^{-2}$ Pa and 300° C. to remove low-boiling components. The resulting composition was designated as Composition 4-4. The yield was 27%. In formula (3b), p2/q2≈1.1 and p2+q2≈85.

Preparation Example 11

A mixture of 40 parts by weight of the nonfunctional perfluoropolyether FOMBLIN M07 (available under the trade name from Solvay Solexis) mixed with 60 parts by weight of Composition 1-4 was designated as Composition 5.

Preparation Example 12

A mixture of 40 parts by weight of the component obtained by thin-film distillation of the nonfunctional perfluoropolyether FOMBLIN M07 at 1×10$^{-2}$ Pa and 300° C. with 60 parts by weight of Composition 1-4 was designated as Composition 6.

Preparation Example 13

A mixture of 60 parts by weight of the component obtained by thin-film distillation of the nonfunctional perfluoropolyether FOMBLIN M07 at 1×10$^{-2}$ Pa and 300° C. with 40 parts by weight of Composition 1-4 was designated as Composition 7.

Preparation Example 14

The product obtained by subjecting a mixture of 40 parts by weight of the nonfunctional perfluoropolyether FOMBLIN M07 with 60 parts by weight of Composition 1-1 to thin-film distillation at 1×10$^{-2}$ Pa and 300° C. was designated as Composition 8. The yield was 35%.

Method of Measuring Percent Weight Loss

Each composition, in an amount of about 20 mg, was placed in an alumina sample pan having a diameter of 4.5 mm and depth of 2 mm, and the weight after one hour of exposure at 250° C. was measured, based upon which the percent weight loss was calculated. The percent weight loss for each of the compositions is given in Table 1.

Measurement Conditions and Apparatus
Measurement apparatus: VPE-9000 SP Saturated Vapor Pressure Evaluation System (Ulvac-Riko, Inc.)
Measurement atmosphere: open air
Measurement temperature: 250° C.
Measurement time: 1 hour

TABLE 1

| Composition | Percent weight loss (%) |
|---|---|
| 1-1 | 32 |
| 1-2 | 15 |
| 1-3 | 8 |
| 1-4 | 3 |
| 2-1 | 3 |
| 3-1 | 2 |
| 4-1 | 35 |
| 4-2 | 17 |
| 4-3 | 10 |
| 4-4 | 8 |
| 5 | 15 |
| 6 | 4 |
| 7 | 5 |
| 8 | 4 |

Examples 1 to 6, Comparative Examples 1 to 8

Preparation of Water/Oil Repellent Treatment Agents

Water/oil repellent treatment agents were prepared by dissolving the respective above compositions in ethyl perfluorobutyl ether (Novec 7200, from 3M) to a solids concentration of 20 wt %.

Formation of Cured Film

The respective water/oil repellent treatment agents were applied by vacuum deposition under the conditions indicated below onto a piece of glass (50 mm×100 mm) having a 10 nm surface most layer of vapor-deposited $SiO_2$ (Gorilla® Glass 2, from Corning Inc.). In each case, the treatment was cured for 1 hour at 120° C. to form a cured coat.

Coating Conditions and Apparatus
Coating apparatus: Small vacuum system for vapor deposition VPC-250 F
Pressure: $2.0×10^{-3}$ Pa to $3.0×10^{-2}$ Pa
Deposition temperature (ultimate temperature of boat): 500° C.
Source-to-substrate distance: 20 mm
Weight of treatment supplied: 10 mg
Deposited weight: 10 mg The water repellency, abrasion resistance, mold release properties and dynamic coefficient of friction for the resulting cured coats were evaluated by the following methods. Each test, both initially and after one hour of heating at 250° C., was carried out in a 25° C., 50% humidity environment. The results are shown in Table 2, together with the compositions within the water/oil repellent treatment agents.

Evaluation of Water Repellency

The contact angle of the cured coat with water (droplet size: 2 μL) was measured using a DropMaster contact angle meter (Kyowa Interface Science Co., Ltd.).

Evaluation of Abrasion Resistance

The abrasion resistance to steel wool (#0000) was evaluated by measuring the water contact angle in the same way as described above after 2,000 rubbing cycles using a TriboGear 30S Friction Tester (Shinto Scientific Co., Ltd.).
Surface area of contact: 1 $cm^2$
Load: 1 kg Evaluation of Mold Release Properties The peel strength was measured under the following conditions using the Autograph® AG-IS (Shimadzu Corporation).
Pressure-sensitive adhesive treatment: Nitto No. 31B
(width, 19 mm; from Nitto Denko Corporation)
Pressure bonding conditions: 20 $g/cm^2$ load
Aging: 25° C./24 hours
Peel rate: 300 mm/min, 180° direction Evaluation of Dynamic Coefficient of Friction The dynamic coefficient of friction with respect to a Bemcot™ (Asahi Kasei Corporation) wipe was measured under the following conditions using a 14FW Surface Property Tester (Shinto Scientific Co., Ltd.).
Surface area of contact: 10 mm×35 mm
Load: 100 g

TABLE 2

| | | Composition | Water contact angle (degrees) | | Abrasion resistance (degrees) | | Mold release properties (N/19 mm) | | Dynamic coefficient of friction | |
|---|---|---|---|---|---|---|---|---|---|---|
| | | | Initial | After heating | Initial | After heating | Initial | After heating | Initial | After heating |
| Example | 1 | 1-3 | 116 | 115 | 110 | 111 | 0.05 | 0.05 | 0.03 | 0.03 |
| | 2 | 1-4 | 115 | 114 | 111 | 110 | 0.04 | 0.04 | 0.03 | 0.03 |
| | 3 | 2-1 | 115 | 115 | 113 | 113 | 0.05 | 0.05 | 0.03 | 0.03 |
| | 4 | 3-1 | 115 | 115 | 114 | 112 | 0.04 | 0.05 | 0.03 | 0.03 |
| | 5 | 6 | 115 | 111 | 111 | 110 | 0.05 | 0.05 | 0.03 | 0.03 |
| | 6 | 8 | 115 | 110 | 110 | 112 | 0.04 | 0.05 | 0.04 | 0.03 |
| Comparative Example | 1 | 1-1 | 116 | 115 | 110 | 85 | 0.04 | 0.10 | 0.03 | 0.05 |
| | 2 | 1-2 | 115 | 114 | 111 | 98 | 0.04 | 0.08 | 0.03 | 0.04 |
| | 3 | 4-1 | 115 | 97 | 110 | 58 | 0.04 | 0.25 | 0.03 | 0.18 |
| | 4 | 4-2 | 115 | 98 | 110 | 82 | 0.04 | 0.22 | 0.03 | 0.15 |
| | 5 | 4-3 | 115 | 105 | 110 | 85 | 0.05 | 0.20 | 0.03 | 0.14 |
| | 6 | 4-4 | 115 | 106 | 110 | 78 | 0.05 | 0.21 | 0.03 | 0.15 |

TABLE 2-continued

| | Composition | Water contact angle (degrees) | | Abrasion resistance (degrees) | | Mold release properties (N/19 mm) | | Dynamic coefficient of friction | |
|---|---|---|---|---|---|---|---|---|---|
| | | Initial | After heating | Initial | After heating | Initial | After heating | Initial | After heating |
| 7 | 5 | 115 | 110 | 110 | 96 | 0.05 | 0.11 | 0.03 | 0.14 |
| 8 | 7 | 115 | 98 | 98 | 95 | 0.05 | 0.05 | 0.03 | 0.03 |

From the above results, in Comparative Examples 1 and 2, low-boiling components evaporated off during heating at 250° C., leading to a decline in the abrasion resistance after heating. In Comparative Examples 3 to 6, because the linkage group Q was —CF$_2$—CH$_2$—O—C$_3$H$_6$—, deterioration due to heating at 250° C. occurred. This gave rise to, after heating, a decline in the water contact angle, a decline in the abrasion resistance, a rise in peel strength and a rise in the dynamic coefficient of friction. By contrast, in Examples 1 to 3 according to the invention, it was possible to retain the properties (water contact angle, abrasion resistance, mold release properties, dynamic coefficient of friction) even after heating at 250° C. Even in Example 4, in which purification to remove low-boiling components was carried out on an intermediate product, excellent properties comparable with those in Examples 1 to 3 were obtained.

In Comparative Example 7, the nonfunctional polymer was not thin-film distilled, as a result of which low-boiling components evaporated off during heating at 250° C., leading to a decrease in the abrasion resistance after heating. In Comparative Example 8, the content of nonfunctional polymer was high, resulting in a poor abrasion resistance. By contrast, in Examples 5 and 6 according to the invention, it was possible to retain the properties (water contact angle, abrasion resistance, mold release properties, dynamic coefficient of friction) even after heating at 250° C.

The inventive water/oil repellent treatment agent which contains a fluorooxyalkylene group-containing polymer-modified silane and/or a partial hydrolyzate/condensate thereof, or which contains both this and also a fluorooxyalkylene group-containing polymer, does not incur changes in water/oil repellency, abrasion resistance, mold release properties and dynamic coefficient of friction even when heated at 250° C. Hence, following film formation on a substrate, this treatment is able to retain its performance even on passing through processes at temperatures of 250° C. or more. The water/oil repellent treatment agent of the invention is thus exceedingly useful, particularly in applications such as touch panel displays and anti-reflective coatings on which finger oils are likely to adhere yet for which visibility is important. The inventive treatment is also useful as a mold release agent in thermal imprinting and the like.

Japanese Patent Application No. 2014-232583 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. A water/oil repellent treatment agent comprising at least one compound selected from the group consisting of fluorooxyalkylene group-containing polymer-modified silanes of general formulas (1) to (4) below

$$A\text{-}Rf\text{-}QZW_\alpha \quad (1)$$

$$Rf\text{-}(QZW_\alpha)_2 \quad (2)$$

$$A\text{-}Rf\text{-}Q\text{-}(Y)_\beta B \quad (3)$$

$$Rf\text{-}(Q\text{-}(Y)_\beta B)_2 \quad (4),$$

wherein Rf is —(CF$_2$)$_d$—(OCF$_2$)$_p$(OCF$_2$CF$_2$)$_q$(OCF$_2$CF$_2$CF$_2$)$_r$(OCF$_2$CF$_2$CF$_2$CF$_2$)$_s$(OCF(CF$_3$)CF$_2$)$_t$—O(CF$_2$)$_d$—, each d being independently an integer from 0 to 5, p, q, r, s and t being each independently an integer from 0 to 500, with the proviso that the sum p+q+r+s+t=40 to 500, and each unit shown in parentheses being randomly bondable;

A is a fluorine atom, a hydrogen atom, or a monovalent fluorine-containing group having a terminal —CF$_3$ group, —CF$_2$H group or —CH$_2$F group;

Q is independently a single bond or a divalent organic group which may be fluorine-substituted and does not contain a hydrocarbon ether bond;

Z is independently a group selected from the group consisting of a single bond, the divalent group -J$_2$C— (where J is independently an alkyl group, a hydroxyl group or the silyl ether group K$_3$SiO— (K being independently a hydrogen atom, an alkyl group, an aryl group or an alkoxy group), the divalent group -L$_2$Si— (where L is independently an alkyl group, an alkenyl group, an alkoxy group or a chloro group), the trivalent group -JC= (where J is as defined above), the trivalent group -LSi= (where L is as defined above), the tetravalent group —C≡, the tetravalent group —Si≡, and siloxane residues having a valence of 2 to 8;

W is independently a hydrolyzable group-bearing moiety of any of general formulas (5a) to (5e) below

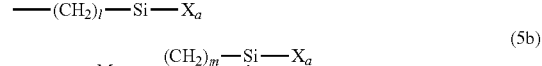

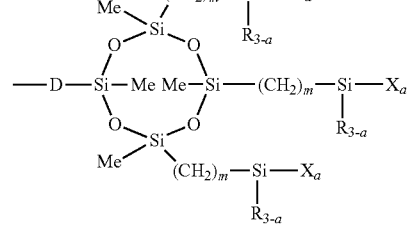

-continued

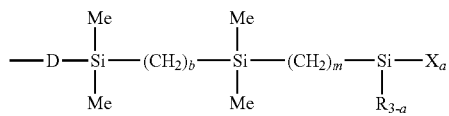
(5c)

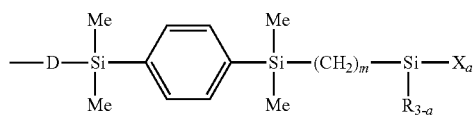
(5d)

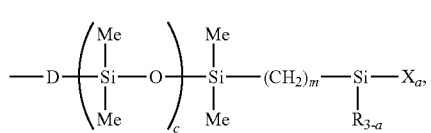
(5e)

R being independently an alkyl group of 1 to 4 carbon atoms or a phenyl group, X being independently a hydrolyzable group, the letter "a" being 2 or 3, the letter "l" being an integer from 0 to 10, each m being independently an integer from 1 to 10, D being a single bond or a divalent organic group of 1 to 20 carbon atoms which may be fluorine-substituted, b being an integer from 2 to 6, c being an integer from 1 to 50, and Me being a methyl group;

α is an integer from 1 to 7;

Y is independently a divalent group having a hydrolyzable group;

β is in each instance an integer from 1 to 10; and

B is independently a hydrogen atom, an alkyl group of 1 to 4 carbon atoms, or a halogen atom, and partial (co)hydrolyzates/condensates thereof in an amount of at least 50% of the total weight exclusive of diluting solvent, wherein the treatment has a percent weight loss after one hour of exposure at 250° C. that is not more than 10% of the total weight exclusive of diluting solvent.

2. The treatment agent of claim 1, wherein Y is selected from the group consisting of groups of general formulas (6) to (8) below

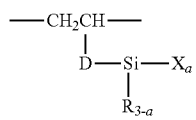
(6)

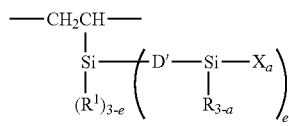
(7)

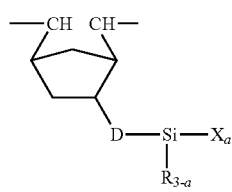
(8)

wherein R, X, the letter "a" and D are as defined above, D' is a divalent organic group of 1 to 10 carbon atoms that may be fluorine-substituted, $R^1$ is a monovalent hydrocarbon group of 1 to 20 carbon atoms, and e is 1 or 2.

3. The treatment agent of claim 1, wherein Q is selected from the group consisting of a single bond and divalent groups of the following formulas

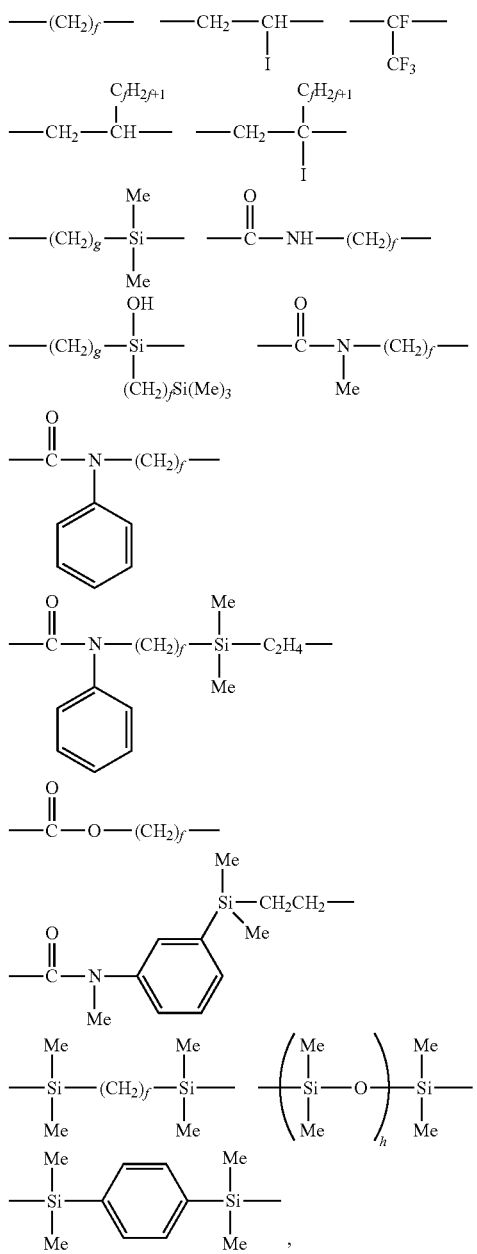

wherein f is an integer from 2 to 4, g is an integer from 1 to 4, h is an integer from 1 to 50, and Me is a methyl group.

4. The treatment agent of claim 1, wherein the hydrolyzable group X is selected from the group consisting of alkoxy groups of 1 to 10 carbon atoms, alkoxyalkoxy groups of 2 to 10 carbon atoms, acyloxy groups of 1 to 10 carbon atoms, alkenyloxy groups of 2 to 10 carbon atoms, halogen groups, and silazane groups.

5. The treatment agent of claim 1, further comprising a fluorooxyalkylene group-containing polymer of general formula (9) below A-Rf-A  (9), wherein Rf and A are as defined above, which fluorooxyalkylene group-containing polymer accounts for at least 0.1 wt % and not more than 50 wt % of the combined amount of the fluorooxyalkylene group-containing polymer-modified silane and/or the partial (co)hydrolyzate/condensate thereof and the fluorooxyalkylene group-containing polymer.

6. An article treated with the water/oil repellent treatment agent of claim 1.

7. An optical article treated with the water/oil repellent treatment agent of claim 1.

8. Glass, chemically toughened glass, physically toughened glass, $SiO_2$-treated glass, sapphire glass, $SiO_2$-treated sapphire glass, a quartz substrate, a silicon wafer or a metal treated with the water/oil repellent treatment agent of claim 1.

9. A touch panel, anti-reflective coating, wearable device, photovoltaic panel or transportation equipment window treated with the water/oil repellent treatment agent of claim 1.

10. An imprinting mold treated with the water/oil repellent treatment agent of claim 1.

11. A method of preparing the water/oil repellent treatment agent of claim 1, comprising the step of:
    thin-film distilling, in the temperature range of 150 to 400° C., the at least one compound selected from the group consisting of fluorooxyalkylene group-containing polymer-modified silanes of formulas (1) to (4) and partial (co)hydrolyzates/condensates thereof to remove low-boiling components.

12. A method of preparing the water/oil repellent treatment agent of claim 5, comprising the step of:
    thin-film distilling, in the temperature range of 150 to 400° C., a mixture of the at least one compound selected from the group consisting of fluorooxyalkylene group-containing polymer-modified silanes of formulas (1) to (4) and partial (co)hydrolyzates/condensates thereof with the fluorooxyalkylene group-containing polymer of formula (9) to remove low-boiling components.

13. A method of preparing the water/oil repellent treatment agent of claim 5, comprising the steps of:
    separately thin-film distilling, in the temperature range of 150 to 400° C., the at least one compound selected from the group consisting of fluorooxyalkylene group-containing polymer-modified silanes of formulas (1) to (4) and partial (co)hydrolyzates/condensates thereof and the fluorooxyalkylene group-containing polymer of formula (9) to remove low-boiling components; and
    mixing together the residue from each distillation.

14. The treatment agent of claim 1, wherein $\alpha$ is an integer of from 2 to 7 in general formula (1) or (2) and $\beta$ is an integer of from 2 to 10 in general formula (3) or (4).

* * * * *